(12) United States Patent
Kohno

(10) Patent No.: US 7,647,727 B2
(45) Date of Patent: Jan. 19, 2010

(54) METHOD OF PREVENTING DEFECTIVE GERMINATION OR ROSETTE FORMATION OF SEED

(75) Inventor: Yasushi Kohno, Hyogo (JP)

(73) Assignee: Agritecno Yazaki Co., Ltd., Hyogo (JP)

( * ) Notice: Subject to any disclaimer, the term of this patent is extended or adjusted under 35 U.S.C. 154(b) by 738 days.

(21) Appl. No.: 10/007,186

(22) Filed: Nov. 5, 2001

(65) Prior Publication Data

US 2002/0112397 A1 Aug. 22, 2002

(30) Foreign Application Priority Data

Dec. 14, 2000 (JP) ............................. 2000-380505

(51) Int. Cl.
*A01G 1/00* (2006.01)
(52) U.S. Cl. ................. 47/58.1 SE; 47/57.6; 47/DIG. 9
(58) Field of Classification Search .................. 47/58.1, 47/57.6, DIG. 9, DIG. 6
See application file for complete search history.

(56) References Cited

U.S. PATENT DOCUMENTS

| 4,735,017 | A | * | 4/1988 | Gago et al. | ................... | 47/57.6 |
| 4,912,874 | A |   | 4/1990 | Taylor      |                    |         |
| 5,294,593 | A | * | 3/1994 | Khan        | ......................... | 504/100 |
| 5,910,281 | A | * | 6/1999 | Kohno et al.| ................. | 264/343 |
| 6,107,051 | A | * | 8/2000 | Job et al.  | ................... | 435/7.92 |

FOREIGN PATENT DOCUMENTS

| AU | 8310760 | A | * | 1/1983 |
| RO | 113935  | B | * | 1/1996 |

OTHER PUBLICATIONS

Acta Horticulturae (No. 267); p. 191-197; Effects of priming on the germination of *Valerianella olitoria* seeds in relation with temperature and oxygen; Corbineau, F.; Come, D.; ISSN: 0567-7572; ISBN: 90-6605-134-5; 1990.*
Journal of New Seeds, Seed Soaking Damage in Some Grain Legumes, Mike Smith, vol. 2, Nov. 3, 2000, 4 pages.*
Starting Plants from Seed, Evans et al, NC State University, Horticulture Information Leaflets, 1999, section on Light. http://www.ces.ncsu.ed/depts/hort/hil/hil-8703.html, 6 pages.*
Germination of Fourwing Slatbush Seed AS Affected by Soaking and Chloride Removal, Twitchell, Moscow, Idaho, University of Idaho, pp. 218-220.*
Corbineau, F. & Come, D. "Effects of priming on the termination of *Valerianella olitoria* seeds in relation with temperature and oxygen," Acta Horticulturae, No. 267, pp. 191-197 (1990).*
Romanian Patent RO 113935B to Badiu et al. English Translation.*
Journal of New Seeds, Seed Soaking Damage in Some Grain Legumes, Mike Smith, Nov. 2000, complete article.*
An evaluation of the potential of low temperature pre-sowing treatments of tomato seeds as a means of improving germination performance, Ann. appl. Biol. (1987), 110, p. 185-194 by Coolbear et al.*
Flowering of *Eustoma grandiflorum* (Raf.) Shinn. Cultivars Influenced by Photoperiod and Temperature, Brent K. Harbaugh, HortScience 30(7):1375-1377, 1995, 8 pages.*
Influence of temperature prior to see ripening and at germination on rosette formation and bolting of *Eustoma grandiflorum*, abstract, Scientia Horticulturae, vol. 53, Issue 3, Feb. 1993, pp. 225-230, K. Ohkawa et al, 7 pages.*

* cited by examiner

*Primary Examiner*—Andrea M Valenti
(74) *Attorney, Agent, or Firm*—Brinks Hofer Gilson & Lione

(57) ABSTRACT

A method of preventing defective germination or rosette formation of a plant seed that tends to suffer from defective germination or rosette formation during growth thereof is provided, which can be easily carried out without using large-scale equipment and makes the sowing after the treatment of the method easy. The method of preventing defective germination or rosette formation of a plant seed includes the steps of: leaving the plant seed to stand in highly watery condition at low temperature in a dark place; and drying the plant seed.

3 Claims, No Drawings

METHOD OF PREVENTING DEFECTIVE GERMINATION OR ROSETTE FORMATION OF SEED

BACKGROUND OF THE INVENTION (1) Field of the Invention

This invention relates to a method of preventing defective germination or rosette formation of a plant seed, which tends to suffer from defective germination or rosette formation during growth thereof.

(2) Description of the Related Art

So far, a seed, which suffers from defective germination or rosette formation during growth thereof, has been subjected to health care of the seedling in a cell tray or a pot and kept at low temperature for a specific period of time, thereby the defective germination or rosette formation at high temperature is prevented from occurring.

When the seedling needs health care, since about thirty thousands seedlings per 10 ares of field are usually required, therefore it has been very difficult to carry out the health care of the seedling from the viewpoint of facilities or workability.

Therefore recently, a refrigerating treatment technique of seeds has attracted a considerable attention. However, in this technique sufficient amount of water has to be supplied to the seeds during the refrigerating treatment, therefore the seeds are immersed in water filled in a container, thereby the refrigerating treatment is carried out.

Among these seeds, which need the improvement in the defective germination or rosette formation at high temperature, there are ultra-micro seeds such as a seed of *Eustoma russellianum*, which are hard to sow even when they are in usual dried condition and all the more hard to sow when they are wet after the refrigerating treatment.

When the seeds are pelletized seeds, they are not suited to the preservation in cooling water, therefore the above refrigerating treatment technique is hard to utilize.

In this respect, a treatment has been proposed, in which the so-called "fluid gel" consisting of granular macromolecular water absorbing entity is employed and the seeds are uniformly dispersed in the fluid gel, then the seeds are sown with the fluid gel after the refrigerating treatment. However, when the seeds are dispersed in the fluid gel before the refrigerating treatment, the fluid gel takes off from the water, failing in holding the seeds.

When the seeds after the refrigerating treatment are dispersed in the fluid gel so as to sow, it is difficult to uniformly disperse the wet seeds after the refrigerating treatment in the fluid gel, therefore the accuracy of the sowing deteriorates bringing about a waste of seeds (that is, the thinning out being needed or positions at which the seeds are not sown being arisen).

SUMMARY OF THE INVENTION

It is therefore an objective of the present invention to solve the above problem and to provide a method of preventing defective germination or rosette formation of a plant seed that tends to suffer from defective germination or rosette formation during growth thereof, which can be easily carried out without using large-scale equipment and makes the sowing after the treatment of the method easy.

In order to attain the above objective, the present invention is to provide a method of preventing defective germination or rosette formation of a plant seed which tends to suffer from defective germination or rosette formation during growth thereof comprising the steps of: leaving the plant seed to stand in highly watery condition at low temperature in a dark place; and drying the plant seed.

With the construction described above, the defective germination or rosette formation can be effectively prevented from occurring without using large-scale equipment that needs extensive area to be installed and the plant seeds after the treatment of the method can be conserved, easily sown and pelletized, thereby the accurate sowing can be carried out, the sowing by a machine can be carried out, the thinning out described above is not needed, and the sowing according to a plan can be carried out.

Furthermore, as unexpected secondary effects with the construction described above, gemmation rate (defined as a rate of that the sown seed germinates and the germ comes out from the surface of the soil) is increased and gemmation force is increased.

DESCRIPTION OF THE PREFERRED EMBODIMENTS

A plant seed, to which the method of preventing defective germination or rosette formation of a plant seed according to the present invention is applied, is a plant seed, which tends to suffer from defective germination or rosette formation during growth thereof, such as a seed of *Eustoma russellianum*, seed starches, and sweet pea.

In the present invention, it is necessary to leave the plant seed to stand in highly watery condition at low temperature in a dark place. Here, the highly watery condition is defined as a condition, in which water to be absorbed by the seed at low temperature in a dark place is sufficiently supplied, such as a condition in which the seed is immersed in water of sufficient amount or a condition in which the relative humidity around the seed is maintained at about 100%.

Here, the low temperature means a temperature from 0° C. (freezing point) to 15° C., which has been used in a conventional method of preventing defective germination or rosette formation of a plant seed. The dark place means a place where the light is intentionally positively screened out. If the seed, which germinates or is promoted to gemmate in the presence of light, is processed, it is necessary to make the place sufficiently dark so that the seed does not germinate or is not promoted to gemmate.

The seed is left to stand in highly watery condition at low temperature in a dark place as described above for a specific period of time. Usually, the specific period of time is any period of time from several days to several months. The specific period of time may be a little longer or shorter than this period of time as the occasion demands.

The plant seed is left to stand in highly watery condition at low temperature in a dark place as described above for a specific period of time (hereinafter, this treatment is called as a refrigerating treatment), thereby a character inhibiting the defective germination or rosette formation is developed in the plant seed.

However, since the surface of the seed after such a treatment is wet, the seed is very hard to handle. Therefore, the drying step is carried out in the present invention.

The drying is carried out in an extent similarly to that of a usual bare seed or in such an extent that the watery condition of the surface of the seed does not permit the seed to adhere to another seed or the container.

Preferably, such drying is carried out by exposing the seed to dry air and removing the water quickly by drying with ventilation. Even in this drying treatment, the treatment is preferably carried out in a place where the amount of light is less than the amount at which the seed germinates or is promoted to gemmate and more preferably carried out in a dark place. In this connection, the drying by using warm air may be employed. However, in such a case, since the seed has already absorbed water and the ventilation at high temperature deteriorates the germination power of the seed, therefore the ventilation has to be carried out with air at relatively low temperature, preferably at a temperature range from 20° C. to 35° C.

Preferably, the drying treatment is carried out right after leaving the seed to stand in highly watery condition at low temperature in a dark place. Furthermore, preferably the drying treatment itself is carried out as quickly as possible.

Generally, if the drying treatment is carried out when the seed is active, the drying treatment adversely affects the gemmation of the seed. However, if the drying treatment is carried out in a manner described above right after leaving the seed to stand in highly watery condition at low temperature in a dark place for a specific period of time, no adverse effect on the seed is observed and the excellent effect of the present invention can be attained.

The dried seed can be handle similarly to a usual seed. That is, the dried seed as it is can be sown in the field or processed to a pelletized seed or gel-coated seed. Even if the seed is further processed as described above, the effect of the present invention, which is to prevent the defective germination or rosette formation during growth of the seed from occurring, can be attained.

Consequently, a supplier of plant seeds performs the method of preventing defective germination or rosette formation of a plant seed according to the present invention in advance and supplies thus treated seeds to a customer, thereby the customer can sow the treated seeds in the same manner as that for conventional seeds and the customer can obtain the effect of the present invention, which is to prevent the defective germination or rosette formation during growth of the seed from occurring.

EXAMPLES

In the following, the method of preventing defective germination or rosette formation of a plant seed according to the present invention will be explained in detail with reference to some examples. However, the scope of the present invention is not limited to such examples.

Example 1

Confirmation for Prevention of Defective Germination and Development of Capability for Prohibiting Rosette Formation at High Temperature Three breeds of *Eustoma russellianum* seeds, that is, *Eustoma russellianum* seeds A (breed name: platinum king), *Eustoma russellianum* seeds B (breed name: cute-pink picoty) and *Eustoma russellianum* seeds C (breed name: Tukusinonami), each of which takes a relatively large number of days until the gemmation and tends to easily suffer from rosette formation at high temperature, were subjected to a refrigerating treatment as follows. That is, respective bare seeds, 1000 grains of each, were immersed in 300 mL of tap water in a 500 mL beaker, subjected to screening-out of light by covering with aluminum foil to prevent the light from being irradiated thereto, and left to stand at 10° C. for 35 days.

Subsequently, thus treated seeds A, B and C, 400 grains of each, were taken out therefrom, then 200 grains out of the respective 400 grains were subjected to a drying treatment, that is, dried by ventilation with dry air at 25° C. so that the moisture content of the seed was adjusted to be 8% w.b. (% w.b.: moisture content by the standard of wet weight).

Thus, regarding the three breeds of *Eustoma russellianum* seeds A, B and C, the seeds subjected to the refrigerating treatment only (comparative example), those subjected to the refrigerating treatment followed by the drying treatment (example; the preferred embodiment of the present invention), and those subjected to no treatment (comparative example), 200 grains of each, were sown in a field provided in a facility, in which irrigation water and temperature adjustment was available, at intervals of 15 cm therebetween June 13th and were grown in the same condition.

In the sowing into the field, the seeds subjected to the refrigerating treatment followed by the drying treatment according to the preferred embodiment of the present invention had an excellent handling property because they are dried.

Regarding these kinds of seeds described above, investigated were date of gemmation, date of bolting, date of efflorescence, ratio of rosette formation, gemmation rate in field, and length of cut flower (i.e. length for which the cut flower can be made). The result is shown in Tables 1 and 2.

TABLE 1

| Breed/Treatment | Date of Gemmation | Date of Bolting | Date of Efflorescence |
|---|---|---|---|
| A/none | 6/24 | 8/24 | 11/17 |
| A/refrigerating | 6/19 | 8/12 | 10/25 |
| A/refrigerating and drying | 6/20 | 8/12 | 10/24 |
| B/none | 6/26 | 8/25 | 10/28 |
| B/refrigerating | 6/20 | 8/6 | 10/21 |
| B/refrigerating and drying | 6/19 | 8/6 | 10/22 |
| C/none | 6/25 | 8/26 | 11/6 |
| C/refrigerating | 6/20 | 8/6 | 10/9 |
| C/refrigerating and drying | 6/19 | 8/10 | 10/12 |

TABLE 2

| Breed/Treatment | Ratio of Rosette Forma. | Gemmation Rate in Field | Length of Cur Flower |
|---|---|---|---|
| A/none | 30% | 69% | 67 cm |
| A/refrigerating | 0% | 88% | 82 cm |
| A/refrigerating and drying | 0% | 91% | 80 cm |
| B/none | 10% | 72% | 66 cm |
| B/refrigerating | 0% | 90% | 72 cm |
| B/refrigerating and drying | 0% | 92% | 74 cm |
| C/none | 42.5% | 70% | 56 cm |
| C/refrigerating | 0% | 87% | 70 cm |
| C/refrigerating and drying | 0% | 89% | 72 cm |

Tables 1 and 2 reveal that the seeds subjected to the refrigerating treatment followed by the drying treatment had an earlier date of gemmation and a significantly lower ratio of rosette formation as compared with the seeds subjected to no treatment with respect to every breed. It is confirmed that the characteristic of the seeds added by the refrigerating treatment was not lost even if thus refrigerated seeds were dried.

Tables 1 and 2 also reveal that the seeds subjected to the refrigerating treatment followed by the drying treatment had a higher gemmation rate in field as compared with the seeds subjected to the refrigerating treatment only.

Example 2

Confirmation of Storage Characteristic

Regarding the three breeds A, B and C, the seeds subjected to the refrigerating treatment in a manner similar to Example 1, 400 grains of each, were taken out. The respective 200 grains out of the 400 grains were dried by ventilation with dry air at 25° C. so that the moisture content of the seed was adjusted to be 8% w.b.

The seeds subjected to the refrigerating treatment (i.e. wet seeds) and those subjected to the refrigerating treatment followed by the drying treatment (seeds according to the preferred embodiment), 200 grains of each, were put into a polyethylene bag and sealed off. These bags were stored in an incubator (i.e. in a dark place), in which the temperature was maintained at 22° C., for 180 days, and subsequently were sown in a field on the same day (June 13th) similarly to Example 1.

Regarding these kinds of seeds described above, investigated were date of gemmation, date of bolting, date of efflorescence, ratio of rosette formation, gemmation rate in field, and length of cut flower. The result is shown in Tables 3 and 4.

TABLE 3

| Breed/Treatment | Date of Gemmation | Date of Bolting | Date of Efflorescence |
|---|---|---|---|
| A/refrigerating | no gemmation | | |
| A/refrigerating and drying | 6/19 | 8/12 | 10/22 |
| B/refrigerating | no gemmation | | |
| B/refrigerating and drying | 6/20 | 8/8 | 10/23 |
| C/refrigerating | no gemmation | | |
| C/refrigerating and drying | 6/19 | 8/11 | 10/12 |

TABLE 4

| Breed/Treatment | Ratio of Rosette Forma. | Gemmation Rate in Field | Length of Cur Flower |
|---|---|---|---|
| A/refrigerating | | 0% | |
| A/refrigerating and drying | 0% | 85% | 80 cm |
| B/refrigerating | | 0% | |
| B/refrigerating and drying | 0% | 88% | 71 cm |
| C/refrigerating | | 0% | |
| C/refrigerating and drying | 0% | 82% | 71 cm |

Tables 3 and 4 reveal that since the seeds subjected to only the refrigerating treatment absorbed water, therefore the gemmation rate in field significantly deteriorated by the storage at ordinary temperature 22° C. To the contrary, although the seeds subjected to the refrigerating treatment followed by the drying treatment deteriorated a little (about 5%) in the gemmation rate in field thereof as compared with those subjected to the refrigerating treatment followed by the drying treatment in Example 1, the gemmation rate in field thereof was maintained about 85%, confirming that a sufficiently high gemmation rate can be maintained after the storage at ordinary temperature for a half year.

Example 3

Confirmation for Application to Seed Processing

Regarding the three breeds A, B and C, the seeds subjected to the refrigerating treatment followed by the drying treatment in a manner similar to Example 1, were pelletized by providing the periphery of the seed with a layer consisting of fine particles of soil by using the same method of pelletizing as that of pelletizing a commercially available pelletized seed of Eustoma russellianum (that is, by placing an order with a specialist of seed processing by pelletizing). The seeds were able to be pelletized in a manner similar to ordinary seeds. These pelletized seeds, 200 grains of each, were sown in a field on the same day (June 13th) similarly to Example 1.

Regarding these kinds of seeds described above, investigated were date of gemmation, date of bolting, date of efflorescence, ratio of rosette formation, gemmation rate in field, and length of cut flower. The result is shown in Tables 5 and 6.

TABLE 5

| Breed/Treatment | Date of Gemmation | Date of Bolting | Date of Efflorescence |
|---|---|---|---|
| A/refrigerating and drying | 6/20 | 8/13 | 10/23 |
| B/refrigerating and drying | 6/19 | 8/8 | 10/23 |
| C/refrigerating and drying | 6/20 | 8/13 | 10/13 |

TABLE 6

| Breed/Treatment | Ratio of Rosette Forma. | Gemmation Rate in Field | Length of Cur Flower |
|---|---|---|---|
| A/refrigerating and drying | 0% | 90% | 82 cm |
| B/refrigerating and drying | 0% | 91% | 71 cm |
| C/refrigerating and drying | 0% | 90% | 70 cm |

Tables 5 and 6 reveal that even when the seeds were pelletized, the seeds had an early date of gemmation in field, the ratio of rosette formation was significantly low, and the gemmation rate in field was maintained high.

Example 4

Confirmation for Improvement in Gemmation Rate and Gemmation Force

With the method according to the present invention, improvement in gemmation rate and gemmation force was observed. (The gemmation force is a gemmation rate in a short period of time after sowing and is a criterion indicating power of a seed and uniform gemmation.) This improvement seems to be attributed to a fact that the water inside the seed, which is left to stand in highly watery condition at low temperature in a dark place, is moved by the drying treatment, thereby an enzyme, which starts the gemmation of the seed, moves in response to the movement of the water.

Regarding the three breeds of Eustoma russellianum seeds A, B and C, the seeds subjected to the refrigerating treatment only, those subjected to the refrigerating treatment followed by the drying treatment (moisture content of the seed: 8% w.b.), and those subjected to no treatment, 400 grains of each, were filled in a cell tray having 200 holes, sown into soil for growing seedlings June 8th, and left to stand in an artificial environmental tester maintained at 20° C. (floodlight being always turned on) without covering the seeds with soil. The irrigation was suitably carried out with observing the moisture of the soil.

Regarding these kinds of seeds described above, investigated were date of gemmation, date of gemmation completion (first date when the number of gemmation stops increasing), and final gemmation rate. The result is shown in Table 7.

TABLE 7

| Breed/Treatment | Date of Gemmation | Date of Gemmation Completion | Final Gemmation Rate |
| --- | --- | --- | --- |
| A/none | 6/17 | 6/22 | 87% |
| A/refrigerating | 6/13 | 6/18 | 90% |
| A/refrigerating and drying | 6/11 | 6/15 | 93% |
| B/none | 6/16 | 6/21 | 84% |
| B/refrigerating | 6/12 | 6/19 | 88% |
| B/refrigerating and drying | 6/11 | 6/16 | 91% |
| C/none | 6/18 | 6/23 | 84% |
| C/refrigerating | 6/14 | 6/17 | 86% |
| C/refrigerating and drying | 6/11 | 6/15 | 91% |

Table 7 reveals that the seeds subjected to the refrigerating treatment followed by the drying treatment had earlier date of gemmation, earlier date of gemmation completion, and higher final gemmation rate as compared with those of comparative examples. There were some differences in the gemmation rate and date of gemmation between the results shown in Tables 1-6 and the result shown in Table 7. These differences seemed to take place because the environment of the seeds was different between Examples 1-3 (the seeds being sown into a field) and Example 4 (the seeds being sown into the soil for growing seedlings in an artificial environmental tester).

The method of preventing defective germination or rosette formation of a plant seed according to the present invention has advantages that the defective germination or rosette formation can be prevented from occurring with securing the same handling characteristic as that of an usual non-treatment seed and that the gemmation rate and the gemmation force are significantly improved (unexpected secondary effects).

What is claimed is:

1. A method of preventing defective germination and rosette formation of a plant seed which tends to suffer from defective germination and rosette formation during growth thereof comprising the steps of:
   a) leaving the plant seed to stand in a highly watery condition at a low temperature in a dark place for a period of time of from several days to several months to inhibit defective germination and rosette formation of the plant seed, the dark place being sufficiently dark to prevent the plant seed from germinating; and
   b) drying the plant seed in a dark place being sufficiently dark to prevent the plant seed from germinating, said drying takes place immediately after leaving the plant seed to stand in the highly watery condition at the low temperature in a dark place,
   wherein in the step a) of leaving the plant seed in a highly watery condition the plant seed is immersed in water at a temperature of from 0° C. to 15° C.

2. A method of preventing defective germination and rosette formation of a plant seed which tends to suffer from defective germination and rosette formation during growth thereof comprising the steps of:
   a) leaving the plant seed to stand in a highly watery condition at a low temperature in a dark place for a period of time of from several days to several months to inhibit defective germination and rosette formation of the plant seed, the dark place being sufficiently dark to prevent the plant seed from germinating; and
   b) drying the plant seed in a dark place, before the seed becomes active, being sufficiently dark to prevent the plane seed from germinating, said drying takes place immediately after leaving the plant seed to stand in the highly watery condition at the low temperature in a dark place,
   wherein in the step a) of leaving the plant seed in a highly watery condition the plant seed is exposed to an environment having a relative humidity of about 100% and a temperature of from 0° C. to 15° C.

3. A method of preventing rosette formation of a plant seed which tends to suffer from rosette formation during growth thereof comprising the steps of:
   a) leaving the plant seed to stand in a highly watery condition at a low temperature in a dark place for a period of time of from several days to several months to inhibit rosette formation of the plant seed, the dark place being sufficiently dark to prevent the plant seed from germinating; and
   b) drying the plant seed in a dark place, before the seed becomes active, being sufficiently dark to prevent the plane seed from germinating, said drying takes place immediately after leaving the plant seed to stand in the highly watery condition at the low temperature in a dark place,
   wherein in the step a) of leaving the plant seed in a highly watery condition the plant seed is immersed in water at a temperature of from 0° C. to 15° C.

* * * * *